United States Patent
Bijlsma et al.

(10) Patent No.: US 7,339,177 B2
(45) Date of Patent: Mar. 4, 2008

(54) RADIATION DETECTOR

(75) Inventors: Sipke Jacob Bijlsma, Eindhoven (NL); Toru Sakai, Eindhoven (NL); Tiemen Poorter, Eindhoven (NL); Martin John Powell, Horley (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 84 days.

(21) Appl. No.: 10/560,681

(22) PCT Filed: Jun. 15, 2004

(86) PCT No.: PCT/IB2004/050912

§ 371 (c)(1),
(2), (4) Date: Dec. 14, 2005

(87) PCT Pub. No.: WO2004/111680

PCT Pub. Date: Dec. 23, 2004

(65) Prior Publication Data

US 2006/0124857 A1    Jun. 15, 2006

(30) Foreign Application Priority Data

Jun. 19, 2003 (EP) .................. 03101805

(51) Int. Cl.
*G01T 1/20* (2006.01)
(52) U.S. Cl. ............................. 250/370.11
(58) Field of Classification Search ........... 250/370.11
See application file for complete search history.

(56) References Cited

U.S. PATENT DOCUMENTS

| 5,401,668 | A | 3/1995 | Kwasnick et al. |
| 5,463,225 | A | 10/1995 | Keasnick et al. |
| 5,777,355 | A | 7/1998 | Possin et al. |
| 5,970,317 | A | 10/1999 | Mizugoti et al. |
| 6,465,861 | B1 | 10/2002 | Liu et al. |
| 6,482,669 | B1 | 11/2002 | Fan et al. |
| 2002/0159563 | A1 | 10/2002 | Tashiro et al. |
| 2003/0010899 | A1* | 1/2003 | Ishii et al. ............... 250/214.1 |
| 2006/0038131 | A9* | 2/2006 | Homme et al. ......... 250/370.11 |

FOREIGN PATENT DOCUMENTS

EP    0838860 A2    4/1998

* cited by examiner

*Primary Examiner*—David Porta
*Assistant Examiner*—Mindy Vu

(57) ABSTRACT

A radiation detector comprises an electrode structure, a planarising layer being disposed over the electrode structure and a protective stack which covers the planarising layer. The planarising layer evens out substantial differences between levels of the electrode structure above the substrate on which the electrode structure is disposed. Consequently, cracks, weak spots and other defects in the protective stack are to a large extent avoided. Because the planarising layer covers essentially the entire electrode structure, practically all sources of defects, notably cracks, in the protective stack are avoided.

14 Claims, 2 Drawing Sheets

RADIATION DETECTOR

Figure 1:
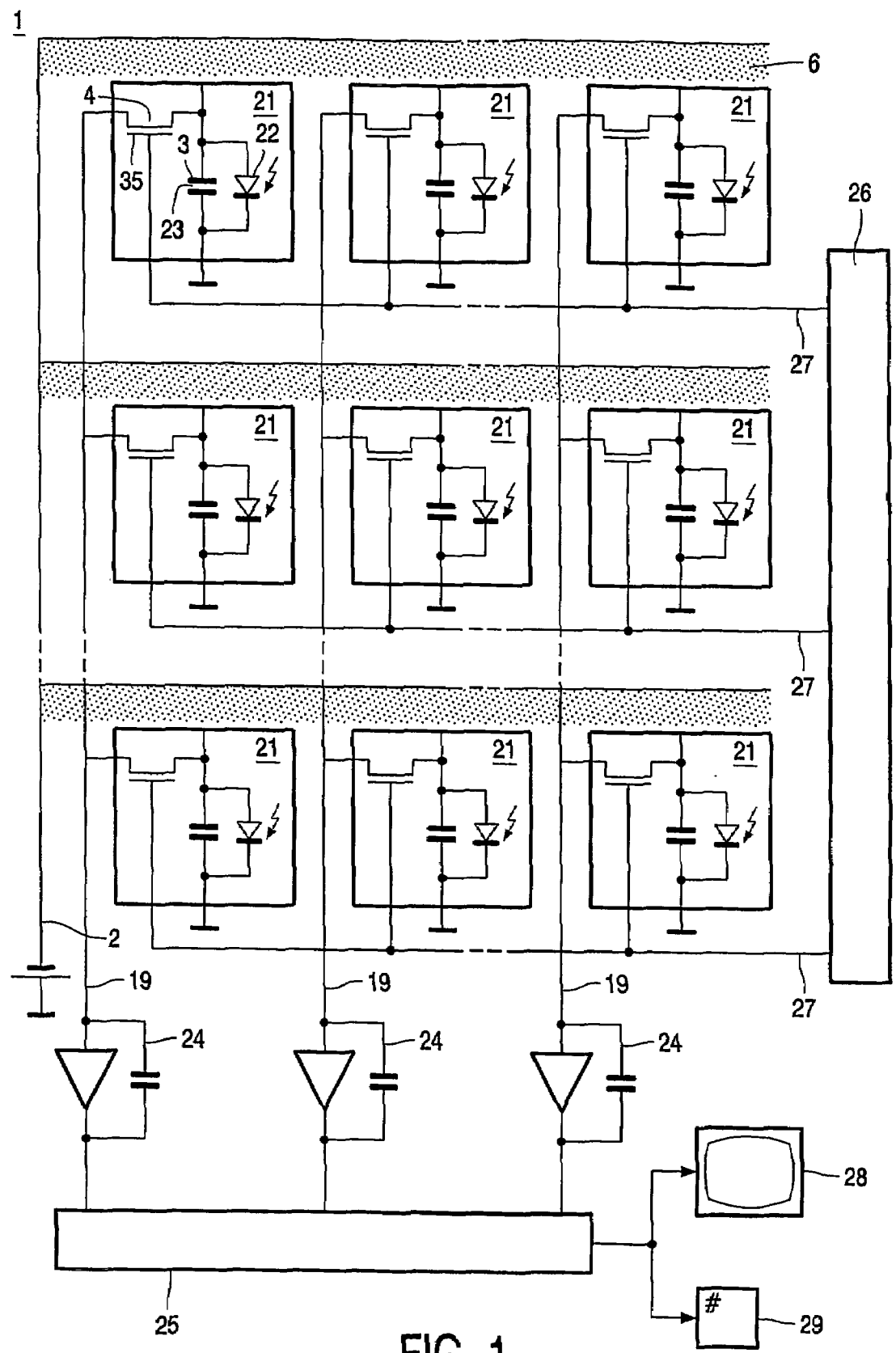

The invention relates to a radiation detector having an electrode structure. Such a radiation detector is known from the U.S. Pat. No. 5,777,355.

The known radiation detector is a radiation imager. The electrode structure of the known radiation imager includes photosensitive elements and metal bottom contacts which are provided on a substrate. The photosensitive elements, notably photodiodes convert incident radiation into electric charges, which are collected at the bottom metal contacts. A common electrode is often patterned into lines or stripes extending over the radiation imager. In the cited US-patent it is recognised that charge leakage is a critical factor in the performance of the photodiodes. There are two significant components of charge leakage, viz. area leakage and sidewall leakage. In particular in smaller diodes in which the area of the sidewalls are relatively large with respect to the overall area of the photodiode, sidewall leakage constitutes the primary source of leakage. Further, the cited US-patent mentions that degradation due to exposure to moisture can make sidewall leakage a significant leakage source. In the known radiation imager, an attempt is made to reduce leakage by applying a polyimide over an inorganic moisture barrier over the upper surface of the photosensitive elements. Still, defects in the moisture barrier layer enable moisture to enter the polyimide and to then spread out to the photodiodes and affecting sidewall leakage. The cited US-patent mentions the use of polymer bridge members that are positioned between the common electrodes and the photodiodes, so as to form a bridge island between adjacent photodiodes. Individual polymer bridge members extend only between a pair of adjacent photodiodes so as to form a bridge island between the pair of photodiodes. As a result, any leakage defects, such as that resulting from moisture or impurities, only affect the pair of adjacent photodiodes. The polymer bridge members are typically isolated from one another so that adverse leakage in a given bridge island does not affect other photodiode pairs. Accordingly, the polymer bridges of the known radiation imager aim at limiting the effect of leakage defects notably due to moisture.

An object of the invention is to provide a radiation detector which is less susceptible to penetration of moisture.

This object is achieved by the radiation detector of the invention comprising
  an electrode structure
  a planarising layer being disposed over the electrode structure and
  a protective stack which covers the planarising layer.

The radiation detector of the invention comprises an electrode structure that includes photosensitive elements, such as photodiodes which convert incident radiation into electric charges. Further, the electrode structure involves collecting electrodes on which the electric charge generated in the photosensor elements are stored. In the electrode structure, read lines are provided to read out the electric charges from the collecting electrodes. To this end the collecting electrodes are switchably coupled to read lines by way of switching elements such as (thin-film) transistors or switching diodes. In order to control the switching elements, addressing lines are provided in the electrode structure. Addressing signals are sent over the addressing lines to open and close the switching elements.

The planarising layer evens out substantial differences between levels of the electrode structure above the substrate on which the electrode structure is disposed. This planarising is achieved in that the top surface of the planarising layer, i.e. the surface facing away from the electrode structure is at substantially a smooth and flat surface. This is achieved in that the planarising layer has a local thickness that is less at portions above thicker portions of the electrode structure and the local thickness is larger at portions above thinner portions of the electrode structure and still thicker above places where the electrode structure is absent. In this way differences in thickness between various portions of the electrode structure are compensated at the top surface of the planarising layer. Consequently, the planarising layer has a top surface that is smooth and substantially void of any substantial level differences. Good results are achieved when the top surface of planarising layer has local corrugations that subtend an angle in the range of 0-45°, and preferably in the range of 0-30°.

The present invention is based on an insight that charge leakage may occur due to defects such as cracks in the protective stack and these cracks may occur at places where there are edges in the electrode structure, not only at the photosensitive elements, such as photodiodes, but also at edges of collecting electrodes, switching elements such as transistors, read lines and addressing lines. Further, preferably the planarising layer covers essentially the entire electrode structure. This is easily achieved by a planarising layer that continuously extends over the electrode structure. Then the protective stack is disposed over the top surface of the planarising layer that is opposite the electrode structure. Consequently, cracks, weak spots and other defects in the protective stack are to a large extent avoided. Because the planarising layer covers essentially the entire electrode structure, practically all sources of defects, notably cracks, in the protective stack are avoided. At least substantially more causes of defects are avoided than what is achieved in the known radiation detector. In practice the density of remaining defects in the protective stack is far less, e.g. less than a percent, than the defect density in the electrode structure. Hence, it is achieved that the defect density of the electrode structure is the dominant source of defects in the radiation detector of the invention. In the radiation detector of the invention, the defect density is suppressed close to or even below the measurement threshold. Accordingly, the protective stack being disposed over the planarising layer very effectively keeps out moisture out of the electrode structure and notably away from any photosensitive elements. The protective stack may be formed as a single protective layer or as a package of several layers.

These and other aspects of the invention will be further elaborated with reference to the embodiments defined in the dependent Claims.

A polymer layer is quite suitable to be employed as the planarising layer. Good results are achieved when an epoxy polymer layer is employed. The viscosity of this epoxy polymer layer is low enough to achieve a planar, flat and smooth top surface. Further, the epoxy polymer layer is easy to pattern, for example by way of lithography or by way of printing. Accordingly, the deposition of the planarising epoxy polymer layer involves a simple process step, so that the radiation detector according to the invention is easy to manufacture. The epoxy polymer layer has a high optical transparency. The epoxy layer is for example designed to have an optical refractive index that is equal to or very close the refractive index of glass. Accordingly, the planarising epoxy polymer layer does not give rise to optical disturbances in the radiation detector of the invention. Further, the epoxy polymer layer is electrically very well isolating and remains electrically neutral. Accordingly, the planarising epoxy polymer layer does not give rise to electrical disturbances in the radiation detector of the invention, notably piezo-electrical effects are avoided.

In a preferred embodiment the protective stack comprises a moisture resistant layer and an outer cover. For example the moisture resistant layer includes a silicon nitride, silicon oxide or silicon oxynitride. Also a multilayer of several silicon nitride, silicon oxide or silicon oxynitride layers may be used as the moisture resistant layer. Excellent protection a against moisture is achieved by the moisture resistant layer of these materials and having a very smooth topography. This very smooth topography is achieved as the top surface of the planarising layer is very level. For example when the moisture resistant layer has a thickness of about 1 µm, then the local corrugations of the planarising layer should subtend locally an angle of less than 45°. When the thickness of the moisture resistant layer is less, say 0.2 µm, then local corrugations of the planarising layer are required to subtend locally an even smaller angle e.g. of less than 30°.

Additionally, the protective stack includes the outer cover in the form of a polymer layer on top of the moisture resistant layer which mechanically protects the radiation detector. In particular the outer cover protects the layers underneath the outer cover against scratches so that penetration of moisture to the electrode structure is avoided. Preferably an acrylate outer cover is employed. The acrylate outer cover can easily be designed to be sufficiently hard to provide good protection against scratches.

A further preferred embodiment of the radiation detector includes a conversion layer. The conversion layer converts incident radiation into secondary radiation of a lower energy. For example, the conversion layer is chosen such that the energy (or wavelength) of the secondary radiation is in a range for which the photosensitive elements of in the electrode structure have a high sensitivity. Notably, a scintillator layer, such as a CsI:Tl may be employed as a conversion layer to convert incident x-radiation into green light. Photosensor elements in the form of Si pin-diodes appear to have a high sensitivity for the green light from the scintillator layer. According to the invention, the hygroscopic property of the scintillator layer does not give rise to defects in the electrode structure because moisture is very effectively kept out of the electrode structure by the moisture protective layer. Notably, electrolytic corrosion of the electrode structure is avoided because moisture cannot reach the electrode structure, even in spite of the hygroscopic scintillator layer.

The conversion layer can be disposed, e.g. on the moisture resistive layer of the protective stack. In an alternative embodiment of the radiation detector of the invention, the conversion layer is provided between the planarising layer and the protective stack.

Preferably, the radiation detector of the invention is an x-ray detector. The x-ray detector of the invention derives an electronic image signal from an x-ray image received by the x-ray detector of the invention.

The invention relates to an electronic device as defined in Claim 6. This electronic device may concern an array photo detector or a display device such as a poly-LED or an organic-LED. These electronic devices of the invention are hardly or not at all susceptible to detrimental effects of moisture, because moisture is very well kept away from sensitive portions of the electrode structure of these electronic devices.

These and other aspects of the invention will be elucidated with reference to the embodiments described hereinafter and with reference to the accompanying drawing wherein FIG. 1 shows a circuit diagram of a sensor matrix 1 incorporated in an x-ray detector according to the invention.

Figure 2:
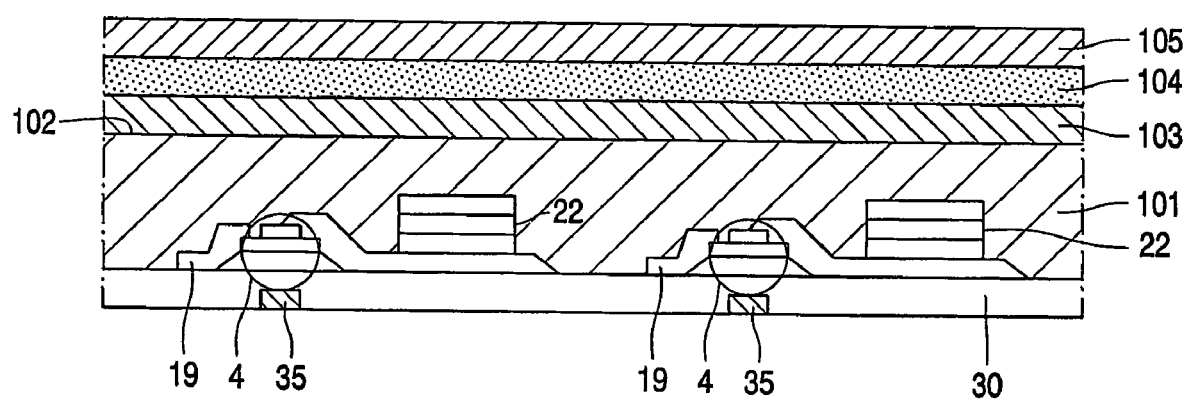

FIG. 2 shows a cross sectional view of an x-ray detector according to the invention.

FIG. 1 shows a circuit diagram of a sensor matrix 1 incorporated in an x-ray detector according to the invention. The sensor matrix incorporates a plurality of sensor elements arranged in a matrix. For each pixel in the x-ray image there is provided a sensor element 21 which comprises a photosensitive element 22, a collecting capacitance 23 and a switching element 4. Electric changes are derived from incident x-rays by the photosensitive element 22, which electric charges are collected by the collection capacitance 23. The collecting electrodes 3 form part of respective collecting capacitances 23. For each column of sensor elements there is provided a respective read-lines 19 and each collecting capacitance 23 is coupled to its respective read-line 19 by way of its switching element 4. Although as an example FIG. 1 shows only 3×3 sensor elements, in a practical embodiment a much larger number of sensor elements say 2000×2000, is employed.

In order to read-out the collected electric charges the relevant switching elements 4 are closed so as to pass electric charges down respective read-lines. Separate read-lines 19 are coupled to respective highly sensitive output amplifiers 24 of which the output signals are supplied to a multiplex circuit 25. The electronic image signal is composed from the output signals by the multiplex circuit 25. The switching elements 4 are controlled by means of a row-driver circuit 26 which is coupled to the switching elements for each row by means of addressing lines 27. The switching elements 4 are preferably formed as thin-film transistors (TFT) of which the drain contact is connected to a relevant read-line, the source contact is connected to the relevant collecting electrode and the gate contact is coupled to the relevant addressing line. The multiplex circuit supplies the electronic image signal e.g. to a monitor 28 on which the image information of the x-ray image is then displayed or the electronic image signal may be supplied to an image processor 29 for further processing.

FIG. 2 shows a cross sectional view of an x-ray detector according to the invention. FIG. 3 notably shows in cross-sectional view a thin-film structure of a sensor matrix incorporated in the x-ray detector of the x-ray examination apparatus according to the invention. On the substrate 30 there are disposed the thin-film transistors 4 and photodiodes 22, which form the photo-electric elements. Notably, instead of photodiodes there may be employed semiconductor photoconducting elements or phototransistors as the photo-electric elements. In particular photodiodes have a simple structure and are therefore easy to manufacture. The photodiodes convert incident radiation such as light or infrared radiation into electric charges. In particular a pin-diode structure is suitable to form such a photodiode. The thin-film transistors 4 form switching elements which couple the photodiodes 22 to respective read-lines 19.

On top of the electrode structure that is formed by e.g. the photosensitive elements 22, read lines 19, addressing lines 24, switching elements 4, collecting electrodes 3, gate contacts 35, the planarising layer 101 is deposited. The epoxy polymer planarising layer at its top surface 102 any level differences at among the various components of the electrode structure are to a large extent levelled off. The planarising layer 101 is covered by the protective stack which includes the moisture resistant layer 103 and the acrylate outer cover 105. In the protective stack the conversion layer 104 in the form of a scintillation layer of e.g. CsI:Tl is integrated.

Such a scintillation layer converts incident x-rays into green light for which the photodiodes are substantially sensitive. Preferably, the CsI:Tl is deposited in the form of columnar crystals, groups of which effectively form lightguides. Such groups of columnar crystals are separated by cracks that are distributed preferably at about 200-400 cracks per centimetre. Typically the thickness of the CsI:Tl layer is in the range 500-1000 µm.

The invention claimed is:

1. A radiation detector comprising:
   an electrode structure;
   a planarising layer being disposed over the electrode structure; and
   a protective stack which covers the planarising layer, wherein the protective stack has a moisture resistant layer and a conversion layer, wherein the conversion layer converts incident radiation into secondary radiation, and wherein the moisture resistant layer is positioned between the conversion layer and the planarising layer, wherein the electrode structure and the planarising layer are positioned along a substrate that is substantially flat, and wherein the planarising layer is in direct contact with the electrode structure and the substrate.

2. A radiation detector as claimed in claim 1, wherein the planarising layer is formed as a polymer layer.

3. A radiation detector as claimed in claim 1, wherein the protective stack includes an outer cover.

4. The radiation detector of claim 3, wherein the planarising layer is a polymer layer.

5. A radiation detector as claimed in claim 1, wherein the conversion layer is a scintillation layer formed of columnar crystals.

6. A radiation detector as claimed in claim 5, wherein the scintillation layer is formed from CsI:Tl.

7. The radiation detector of claim 1, wherein the moisture resistant layer is in direct contact with the planarising layer.

8. An electronic device comprising:
   a substrate;
   an electrode structure disposed on the substrate;
   a planarising layer being disposed over the electrode structure and substrate; and
   a protective stack which covers the planarising layer, wherein the protective stack has a moisture resistant layer and a conversion layer, wherein the conversion layer converts incident radiation into secondary radiation, wherein the moisture resistant layer is positioned between the conversion layer and the planarising layer, wherein the conversion layer is in direct contact with the moisture resistant layer, and wherein the substrate is substantially flat.

9. The electronic device of claim 8, wherein the planarising layer is formed as a polymer layer.

10. The electronic device of claim 8, wherein the conversion layer is a scintillation layer formed of columnar crystals.

11. The electronic device of claim 10, wherein the scintillation layer is formed from CsI:Tl.

12. The electronic device of claim 8, wherein the moisture resistant layer is in direct contact with the planarising layer.

13. The electronic device of claim 8, wherein the planarising layer is in direct contact with the electrode structure and the substrate, and wherein the planarising layer is a polymer layer.

14. An electronic device comprising:
   a substrate:
   an electrode structure disposed on the substrate;
   a planarising layer being disposed over the electrode structure and substrate; and
   a protective stack which covers the planarising layer, wherein the protective stack has a moisture resistant layer and a conversion layer, wherein the conversion layer converts incident radiation into secondary radiation, wherein the moisture resistant layer is positioned between the conversion layer and the planarising layer, wherein the substrate is substantially flat, and wherein the protective stack includes an outer cover.

* * * * *